Oct. 23, 1945.　　　　S. M. MARCO　　　　2,387,401
VARIABLE SPEED TRANSMISSION
Filed Dec. 19, 1942　　　　2 Sheets-Sheet 2
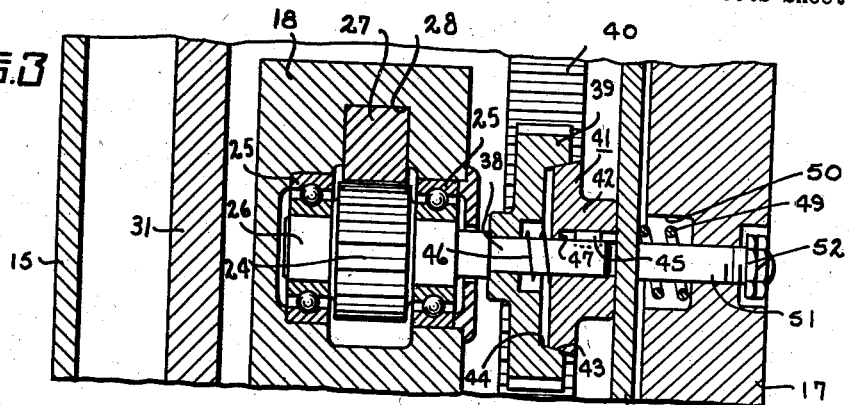
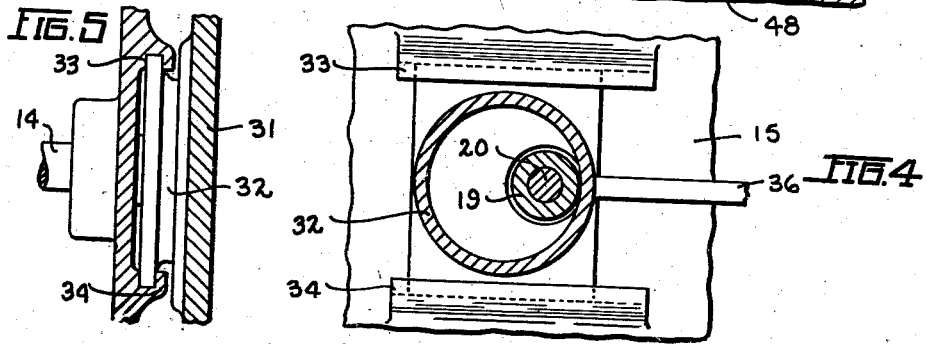
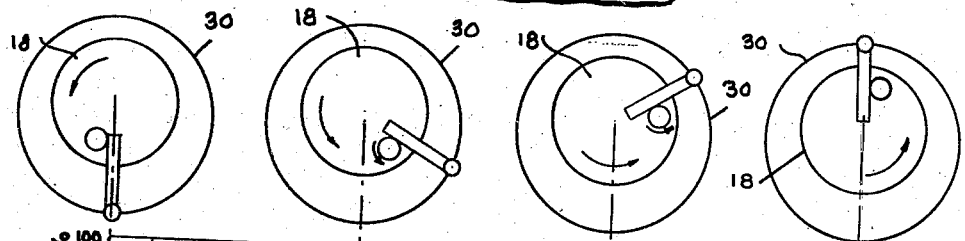
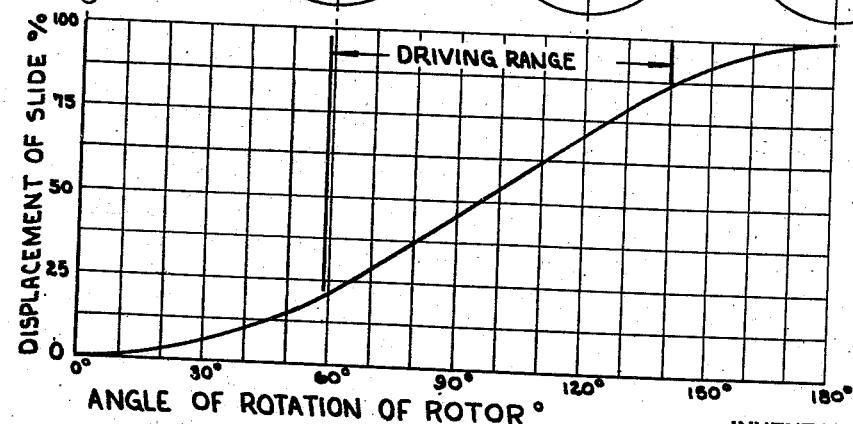
INVENTOR
SALVATORE M. MARCO
BY
ATTORNEY Patented Oct. 23, 1945

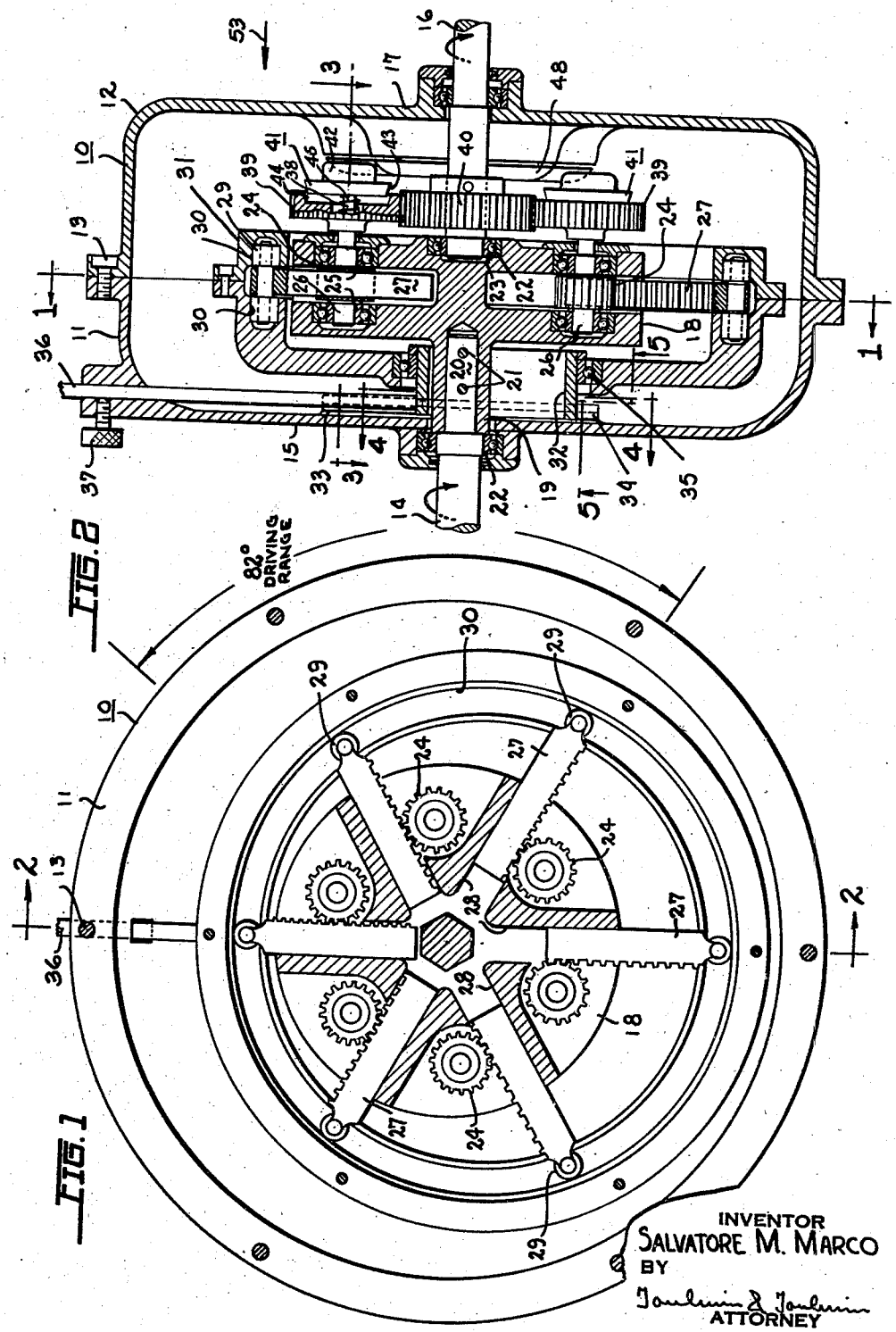

2,387,401

UNITED STATES PATENT OFFICE 2,387,401

VARIABLE SPEED TRANSMISSION

Salvatore M. Marco, Columbus, Ohio, assignor to The Ohio State University Research Foundation, Columbus, Ohio, a corporation of Ohio Application December 19, 1942, Serial No. 469,502

10 Claims. (Cl. 74—115)

This invention relates to an apparatus for transferring power from a driving shaft to a driven shaft and to vary the speed of the driven shaft.

An object of the invention is to provide a variable speed transmission of the mechanical type for increasing or decreasing the speed of a driven shaft relative to a driving shaft.

Another object of the invention is to provide a variable speed transmission using a planetary gear system for transmitting power from the driving shaft to the driven shaft.

Another object of the invention is to provide a variable speed transmission in accordance with the foregoing object wherein the planet gears are adapted to add to or decrease the speed of the driven shaft relative to the drive shaft.

It is another object of the invention to provide a variable speed transmission constructed and arranged in accordance with the foregoing objects wherein the planet gear drives the sun gear only during a predetermined angle of rotation of the planet gear around the sun gear.

It is another object of the invention to provide a variable speed transmission using a planetary gear system for driving the driven shaft and a rack and gear system for driving the planet gears of the planetary system for increasing or decreasing the speed of rotation of the driven shaft relative to the driving shaft.

Another object of the invention is to provide a variable speed transmission wherein a radially actuated mechanism operates a planetary gear system for increasing or decreasing the speed of the driven shaft relative to the speed of a drive shaft.

Another object of the invention is to provide a variable speed transmission of the mechanical type wherein a driving mechanism engages the driven shaft intermittently for regulating the speed of the driven shaft.

It is another object of the invention to provide a variable speed transmission in accordance with the foregoing object wherein the driving mechanism engages the driven shaft only when the speed of movement of the driving mechanism is substantially constant so that the speed of rotation of the driven shaft will be constant.

Another object of the invention is to provide a variable speed transmission wherein a planetary gear system intermittently drives a driven shaft, and the mechanism for driving the planet gears is constructed and arranged to engage the planet gears for driving them and thus driving the driven shaft only when the driving mechanism is operating at a relative constant speed.

Further objects and advantages will become apparent from the drawings and the following description.

In the drawings:

Fig. 1 is a cross-sectional view of the transmission of this invention taken along line 1—1 of Fig. 2.

Fig. 2 is a cross-sectional view of the transmission taken along line 2—2 of Fig. 1.

Fig. 3 is an enlarged portional cross-sectional view of the transmission taken along line 3—3 of Fig. 2.

Fig. 4 is a cross-sectional view of the shift ring of the transmission taken along line 4—4 of Fig. 2.

Fig. 5 is a cross-sectional view of the shift ring for the transmission taken along line 5—5 of Fig. 2.

Fig. 6 is a schematic illustration of the driving range of the planet gears of the planetary gear system.

In this invention the variable speed transmission consists of a casing 10 consisting of two members 11 and 12 that are suitably secured together by means of screws 13. A drive shaft 14 is bearinged in the wall 15 of the casing member 11 and a driven shaft 16 is bearinged in the wall 17 of the casing member 12. A spider 18 is positioned within the casing 10 and is provided with an extension 19 that receives the inner end 20 of the drive shaft 14, the end 20 being secured to the extension 19 by means of pins 21 so that the spider 18 will be driven by the drive shaft 14. The driven shaft 16 is bearinged in the spider 18 in a ball bearing 22 set within a recess 23 provided in the spider 18.

The spider 18 is thus adapted to be rotated coaxially with the drive shaft 14 and the driven shaft 16. The spider 18 may also be referred to as the main rotor or driving rotor for actuating the mechanism that alters the speed of the driven shaft 16.

The spider or rotor 18 carries a plurality of pinions 24 that are bearinged in the walls of the rotor 18 by means of the ball bearings 25 upon a shaft 26. Racks 27 are slidably disposed in guide tracks 28 provided in the rotor 18, the racks 27 being constantly in mesh with the pinions 24.

The outer ends of the racks 27 are provided with rollers 29 that engage tracks 30 provided on opposite sides of the racks 27 and in the auxiliary rotor 31. The auxiliary rotor 31 is bearinged upon a shift ring 32 that is guided in the tracks 33 and 34 provided on the inner surface of the wall 15 of the case member 11, the ball bearing 35 being positioned between the auxiliary rotor 31 and the shift ring 32. A shift rod 36 has one end thereof in threaded engagement with the shift ring 32 and the opposite end extends through the wall of the case member 11 so that the shift ring can be moved within the tracks 33 and 34 and thus change the eccentric position of the auxiliary rotor 31 relative to the main rotor 18 for changing the speed of operation of the driven shaft 16 in a manner that will be hereinafter described. Since the auxiliary rotor 31 rotates freely on the shift ring 32, the tracks 30 will turn at the same rotative speed as the main rotor; therefore, the relative motion between the rollers 29 and the tracks 30 will be very small. A thumb screw 37 is provided in the case member 11 adjacent the shift rod 36 to lock the rod in a predetermined position if desired.

The supporting shafts 26 for the pinions 24 are provided with extensions 38 upon which there is secured a spur gear 39 which forms a planet gear of a planetary gear system. The gears 39 are secured to the extending portion 38 of the shaft 26 so that they will be rotated upon the axis of the shaft 26 whenever the pinion 24 is rotated. As will be noted in Fig. 1 there are a plurality of pinions carried by the main rotor 18, each pinion therefore is associated with a planet gear 39.

The planet gears 39 mesh with a sun gear 40 that is secured to the driven shaft 16 for rotating the same.

Each of the planet gears 39 has a clutch mechanism associated therewith and for the purpose of this invention is described as a friction clutch. Each of the clutches 41 associated with the planet gears 39 consists of a movable clutch member 42 that is provided with a conical face 43 adapted to engage a conical recess 44 provided in the planet gears 39. The clutch member 42 is slidable axially upon the extending portion 38 of the pinion shaft 26 but is keyed thereto by means of the key 45, whereby the clutch member 42 is driven by the pinion shaft 26 when it is rotated for thus driving the planet gear 39. A spring 46 is provided between the planet gear 39 and the movable clutch member 42 for normally causing separation thereof, a stop 47 being provided on the clutch member 42 to prevent the same from being completely removed from the pinion shaft 26.

In order to cause the clutch members to engage with the planet gears 39 over a predetermined arc of rotation of the rotor 18, a cam track 48 is carried by the wall 17 of the case member 12, the cam track 48 being raised in a certain portion thereof so that when the clutch members 42 strike the cam track 48 they will be moved into engagement with the planet gears 39 and thus frictionally drive the planet gears. The cam track 48 may be resiliently pressed against the clutch members 42 by means of the spring 49, or a series of such springs positioned beneath the surface of the cam track 48 in a recess, or recesses 50 provided in the wall 17 of the case member 12. Suitable means is provided for preventing the cam track 48 from being removed from its position adjacent the wall 17 such as the screw-threaded stem 51 and the nuts 52. The form of the clutch mechanism that can be used in the mechanism of this invention and the apparatus is not to be so limited as to prevent the use of other clutch mechanisms.

A suitable source of power is connected to the drive shaft 14, and a mechanism to be driven is connected to the driven shaft 16. The variable speed transmission is adapted to control the speed of the driven shaft 16 relative to the drive shaft 14 so that the driven apparatus can be operated at any desired speed. The apparatus of this invention is particularly adapted for driving the driven apparatus either at the same speed as the speed of rotation of the drive shaft or at a greater speed or a less speed.

Considering the auxiliary rotor 31 to be positioned so that the axis of the rotor 31 coincides with the axis of the main rotor 18, it will be readily apparent that when the main rotor 18 is rotated that the rollers 29 carried upon the ends of the racks 27 will rotate in the track means 30 coaxial with the axis of the main rotor 18. Therefore, there will be no relative movement between the racks 27 and the main rotor 18.

As previously mentioned the clutch members 41 engage the planet gears 39 during a predetermined angle of rotation of the main rotor 18, this engagement being produced by the cam track 48. When the clutch means 41 are engaged with the planet gears 39, the planet gears 39 will drive the sun gear 40 to rotate the shaft 16. Whenever the clutch means 41 are disengaged from the planet gears 39, the planet gears will merely rotate on their own axes. Therefore, the driven shaft 16 will rotate at the same speed as the drive shaft 14 when the axes of the auxiliary rotor 31 is coaxial with the main rotor 18.

When the auxiliary rotor 31 is shifted from a position whereat its axis is coaxial with the axis of the main rotor to a position whereat the axis of the auxiliary rotor is eccentric to the axis of the main rotor 18, the variable speed transmission will increase or decrease the speed of rotation of the driven shaft 16 relative to the drive shaft 14 depending upon the eccentric position of the auxiliary rotor 31 relative to the main rotor 18. Considering the auxiliary rotor 31 to be positioned eccentric relative to the main rotor 18, as shown in Fig. 2, the driven shaft 16 will rotate at a slower speed than the drive shaft 14. Considering the drive shaft 14 to be rotating in a counterclockwise direction when the apparatus is viewed in the direction of the arrow 53, see Fig. 2, the main rotor 18 will be rotated in a counterclockwise direction. The racks 27 will thus be moving from the bottom to the top of the view, as shown in Fig. 1, so that they will be forced inwardly in their guide tracks 28 to thus rotate the pinions 24 in a counterclockwise direction. The pinions 24 will thus rotate the planet gears 39 in a counterclockwise direction when the clutch mechanisms 41 engage the planet gears 39 and thereby produce clockwise rotation of the sun gear 40. The auxiliary rotor 31 is free to rotate upon the shift ring 32 so that in general the direction of rotation of the auxiliary rotor and the planet gears 39 are counterclockwise. Since the sun gear 40 is driven in a clockwise direction through the gear train just referred to it will be seen that the rotation of the sun gear 40 opposes the general rotation and thereby subtracts from the total rotation of the planet gears 39 by the amount of rotation of each of the planet gears, whereby the driven shaft 16 will be rotated at a slower speed than the drive shaft 14.

In order to maintain constancy of speed of rotation of the driven shaft 16 when the shift control rod 36 has been actuated to preset the eccentricity of the auxiliary rotor relative to the main rotor, it is essential that the rotation of the planet gears to produce the decreased rotation of the driven shaft shall be relatively constant. Therefore, it becomes necessary to drive the planet gears 39 only when the movement of the racks 27 is at a relatively constant velocity which is the linear function of the angle of rotation of the main rotor 18. When the rack 27 moves from its extreme outward position to its extreme inward position, as represented by the bottom and top positions of the rack, as shown in Fig. 1, it is apparent that it begins at substantially no velocity of movement and passes through a maximum velocity. This is represented by the chart and schematic diagram shown in Fig. 6. In one portion of the driving range of the racks 27 the velocity of movement of the racks 27 is relatively constant and therefore is approximately a linear function of the angle of rotation. The driving range wherein the velocity of movement of the rack 27 is approximately a straight line function is calculated to be about 82° of the complete circumference of rotation of the rack 27. The particular angle at which the driving engagement between the planet gear 39 and the sun gear 40 is accomplished is approximately 58° from the maximum out position of the rack 27, and the clutch 41 disengages from the planet gear 39 to break driving engagement between the planet gear and the sun gear 40 when the rack 27 has moved past the 140° angle of rotation from the maximum out position from the rack 27. The cam track 48 is of sufficient length to control the engagement of the clutches 41 to cover this driving range. The schematic representation of the main and auxiliary rotors and the relative position of the rack and pinion over 180° of rotation of the rack is represented in the figures positioned above the chart upon which the driving range is indicated. The driving range is preferably made so that one rack has entered the driving range before the one ahead has left it, thus causing engagement of the clutch at a time when the rotative speed of the planet gear 39 is approximately the same as the rotative speed of the clutch member 42.

If the eccentricity of the auxiliary rotor 31 is positioned on the opposite side of the axis of the main rotor 18 from that shown in Fig. 2 then the racks 27 will be moving outwardly relative to the main rotor 18 to rotate the pinions 24 in a clockwise direction and thus rotate the planets 39 in a clockwise direction to add to the rotation of the driven shaft 16 and thus increase its speed over the speed of the driving shaft 14 by the amount of rotation of the planet 39, the driving range of each of the racks 27 remaining the same as heretofore described. From the foregoing description it will be relatively apparent that a radially moving member can produce a change in speed of a driven member by producing rotation of a planetary gear system that either adds to or subtracts from the general rotation of the planetary system to increase or decrease the speed of the driven shaft.

While the form of the apparatus disclosed and described herein constitutes a preferred form, yet it is to be understood that the apparatus is capable of mechanical alteration without departing from the spirit of the invention, and that all such modifications as fall within the scope of the appended claims are intended to be included herein.

Having thus fully described my invention, what I claim as new and desire to secure by Letters Patent is:

1. A variable speed transmission including a driving rotor having radially extending passages therein, a planetary gear system for driving an output shaft, means connecting the planet gears of said planetary system to said rotor for rotating the planet gears in an orbital path, means comprising means extending into said passages for producing fixation between the planet gears and the sun gear of the planetary system over a predetermined angle of orbital rotation of said planet gears to rotate the sun gear, and reciprocable means producing rotation of the planet gears on their own axes during actuation of the last mentioned means for changing the speed of rotation of the sun gear.

2. A variable speed transmission including a driving rotor having radially extending passages therein, track means movable eccentrically relative to said driving rotor, means extending between said track means and said rotor reciprocably movable in said passages, an output shaft means, a planetary gear system for rotating said output shaft means having planetary gears freely rotatable upon shaft means carried by said rotor, means operably connecting said shaft means to said reciprocable means for rotation thereby, clutch means for preventing rotation of said planet gears relative to said shaft means carried by said rotor, and means for actuating said clutch means over a predetermined angle of orbital rotation of said planet gears to thereby cause said planet gears to rotate the sun gear of the planetary system as caused by the rotation of said shaft means carried by said rotor and drive said output shaft.

3. A variable speed transmission including a driving rotor having radially extending passages therein, track means disposed adjacent said rotor and adapted to be moved eccentrically relative to said rotor, pinion means carried by said rotor, rack means engaging said track means for rotating said pinion means due to relative movement of said rack means in said passages as caused by the eccentric position of said track means relative to said rotor, a planetary gear system for driving an output shaft including a sun gear for driving the output shaft and planet gears supported by shaft means for said pinion means and freely rotatable thereon, and clutch means actuated over a predetermined angle of rotation of said rotor to interconnect said pinion shaft means and said planet gears to thereby rotate said sun gear and the driven shaft, the speed of rotation of the driven shaft being regulated by the eccentric position of said track means relative to said rotor which results in rotation of the pinion means to alter the speed of rotation of the sun gear from the general rotation of the planet gears as produced by said rotor.

4. A variable speed transmission including a driving rotor having radially extending passages therein, track means disposed adjacent said rotor and adapted to be moved eccentrically relative to said rotor, pinion means carried by said rotor, rack means engaging said track means for rotating said pinion means due to relative movement of said rack means in said passages as caused by the eccentric position of said track means relative to said rotor, a planetary gear system for driving an output shaft including a sun gear for driving the output shaft and planet gears supported by shaft means for said pinion means and freely rotatable thereon, clutch means actuated over a predetermined angle of rotation of said rotor to interconnect said pinion shaft means and said planet gears to thereby rotate said sun gear and the driven shaft, the speed of rotation of the driven shaft being regulated by the eccentric position of said track means relative to said rotor which results in rotation of the pinion means to alter the speed of rotation of the sun gear from the general rotation of the planet gears as produced by said rotor, and means for changing the eccentric position of said track means relative to said rotor to alter the angle of rotation of said pinion means and thus alter the speed of rotation of the output shaft.

5. A variable speed transmission including a driving rotor having radially extending passages, an auxiliary rotor disposed adjacent said driving rotor and having track means thereon, pinion means carried by said driving rotor upon pinion shaft means that extends from said rotor and supports the planet gears of a planetary gear system, the planet gears being freely rotatable on said pinion shaft means, rack means engaging reciprocably movable in said passages said pinion means and having means engaging said track means for moving said rack means due to the eccentric position of said auxiliary rotor relative to said driving rotor, clutch means for connecting said pinion shaft means and said planet gears, means actuating said clutch means during a predetermined angle of rotation of said driving rotor to cause said planet gears to drive the sun gear of the planetary system and thus rotate the driven shaft, and means for altering the eccentric position of said auxiliary rotor relative to said driving rotor to alter the rotation of said pinion means and thereby alter the speed of rotation of the sun gear of said planetary gear system to change the output speed of the driven shaft.

6. In a variable speed transmission, a primary rotor having radially extending passages therein adapted to be driven by a driving mechanism, a secondary rotor adapted to be disposed eccentrically relative to said primary rotor, reciprocable means extending between said secondary rotor and said primary rotor for radial and reciprocable movement in said passages as caused by the eccentric position of said secondary rotor relative to said primary rotor, a driven shaft, and means intermittently connecting said driven shaft with said reciprocable means for thereby driving said shaft at a different speed from that of the primary rotor due to relative movement between said primary rotor and said reciprocable means.

7. In a variable speed transmission, a primary rotor having radially extending passages therein adapted to be driven by a driving mechanism, a secondary rotor adapted to be disposed eccentrically relative to said primary rotor, reciprocable means extending between said secondary rotor and said primary rotor for radial and reciprocable movement in said passages as caused by the eccentric position of said secondary rotor relative to said primary rotor, said means having a periodical cycle of variable reciprocable movement a portion of which is relatively constant, a driven shaft, and means intermittently connecting said driven shaft with said reciprocable means only during that portion of its movement wherein the movement is relatively constant for thereby driving said shaft at a different speed from that of the primary rotor due to relative movement between said primary rotor and said reciprocable means.

8. In a variable speed transmission, a driving rotor having radially extending passages therein, track means movable eccentrically relatively to said rotor, a planetary gear system carried by said rotor having planet gears freely rotatable relatively to said rotor and clutch means for immobilizing said planet gears relatively to said rotor, and reciprocable means movable in said passages and extending between said rotor and said track means for rotating said planet gears upon reciprocation of said reciprocable means as caused by the eccentric position of said track means relative to said rotor, gear means operably connected to a driven shaft and rotated by said planet gears for rotating said driven shaft, and means actuating said clutch means during a predetermined angle of rotation of said primary rotor, whereby to drive said driven shaft.

9. In a variable speed transmission, a primary rotor having radially extending passages therein, a plurality of planet gears carried by said rotor freely rotatable relatively to said rotor and including clutch means to cause driving engagement by the said rotor and said planet gears, a secondary rotor movably eccentrically relatively to said primary rotor, reciprocable means movable in said passages in said primary rotor engaging said secondary rotor and operably connected to said planet gears for rotating the same as caused by the eccentricity of said secondary rotor relatively to said primary rotor, gear means operably connected to a driven shaft engaged by said planet gears for driving the same, and means actuating said clutch means during a predetermined arc of rotation of said primary rotor to drive said driven shaft.

10. In a variable speed transmission the combination of, a primary rotor having radially extending passages, secondary rotor movably eccentrically relative to said primary rotor, a planetary gear system carried by said primary rotor operably connected to a driven shaft for driving the same upon orbital rotation of said primary rotor, clutch means for immobilizing the planet gears of said planetary gear system during a predetermined arc of rotation of said primary rotor for driving said driven shaft, and reciprocable means, movable in said passages, extending between said primary rotor and said secondary rotor actuated by the eccentric position of the secondary rotor relative to the primary rotor operably connected to said planet gears for rotating the same and thereby drive the driven shaft at a different speed from that of the primary rotor.

SALVATORE M. MARCO.